3,010,796
ELECTRIC FURNACE OPERATION

John R. Alexander, Kirkwood, Mo., and Frank P. Hendrickson, Soda Springs, Idaho, assignors to Monsanto Chemical Company, St. Louis, Mo., a corporation of Delaware
No Drawing. Filed Jan. 12, 1959, Ser. No. 786,016
5 Claims. (Cl. 23—223)

This invention relates to an improved and novel method for operating electric furnaces. More specifically, the invention relates to an improved and novel method for operating that type of electric furnace utilizing carbon electrodes in the processing or treatment of oxidic raw materials. The term "carbon electrode" as used herein, includes graphite as well as other useful or conventional forms of carbon electrodes.

There is a rather large number of chemical and metallurgical processes which are carried out in electric furnaces utilizing carbon electrodes and involving the processing of oxidic raw material. Particularly familiar examples of such processes are the electric furnace processes for producing elemental phosphorus and iron, and the electrolytic production of aluminum, from the respective oxides thereof. Analogous processes are often used in the production of ferroalloys—i.e., alloys of silicon, chromium, vanadium, phosphorus, manganese, cobalt, niobium, molybdenum, titanium, tungsten, and the like. Similar processes are also used in the production of the so-called scavenger alloys—i.e., non-ferrous alloys of alkali or alkaline earth metals with elements utilized in the above listed ferroalloys, or mixtures of any of those elements, such as calcium silicide, etc. Other well-known electric furnace operations involving carbon electrodes and oxidic raw materials are those in which materials such as calcium carbide, alumina and the like are produced.

In all of the electric furnace processes such as described above, the carbon electrodes are consumed at a relatively rapid rate because of the presence of the raw material oxides in the furnace. Because of the relatively high cost of electrodes, there has been a long existing and long recognized need for finding ways to reduce the rate of consumption of these electrodes without adversely affecting the efficiency of the furnace operation or the quality of the production.

It has now been found that the above-discussed carbon electrode consumption can be reduced by as much as 80% or more by the methods described hereinafter, which methods involve the continuous introduction into the electric furnace, through an opening in the interior of the electrode, of a carbonaceous reducing agent in a sufficient amount and in a sufficiently fine state of dispersion to continuously maintain an appreciable concentration of such carbonaceous reducing agent in the turbulent gaseous atmosphere within the electric arc immediately adjacent the end of the electrode. In this way that surface of the electrode which is most susceptible to attack by the oxidizing atmospheres otherwise generated in such electric furnace processes is protected by a localized area of a highly reducing atmosphere.

One way in which the present invention can be utilized is by introducing into the furnace through the carbon electrode a gaseous carbonaceous reducing agent, e.g., butane or acetylene. While this method has the advantage of ease of handling and ease of dispersion in the turbulent atmosphere in the carbon arc, there are other disadvantages, such as the introduction of hydrogen or other elements into the furnace, which make the use of gases somewhat less preferable under many circumstances.

The preferred method for carrying out the present invention is to introduce carbon in solid, finely pulverized form into the furnace through an opening in the central portion of the electrode. Typically suitable sources of such solid carbon are wood charcoal, or coke from coal or petroleum sources. Other solid carbon sources, such as carbon black, channel black or lamp black, as well as modifications of the foregoing, can also be used. In general, it will be desirable to utilize carbonaceous reducing agents containing only relatively small amounts of inorganic oxide or organic impurities, since such impurities will often promote chemical attack upon the electrode. It should, of course, be apparent that the solid carbonaceous reducing agent must be introduced through the central portion of the hollow electrode in the substantially complete absence of any of the oxidic raw materials which are otherwise being charged to the electric furnace.

In order that the solid carbonaceous reducing agent be readily and effectively maintained in gaseous suspension adjacent the electrode, such solid carbonaceous reducing agents should be rather finely subdivided or pulverized. A typically suitable state of subdivision will be such that at least about 90% of such solid carbon will pass through a 4-mesh, and preferably an 8-mesh, screen. A particularly preferred embodiment of the invention involves the use of solid carbon pulverized to such a degree that substantially all of it will pass through an 8-mesh screen.

The pulverized solid carbonaceous reducing agent can be conveniently introduced into the furnace through the electrodes by placing a hopper or similar reservoir adjacent the upper end of the electrode and metering the pulverized reducing agent from the reservoir into the upper end of an opening running the length of the electrode. Such metering can be effected by means of a screw feeder extending from the reservoir into the upper end of the opening in the hollow electrode.

The rate of introduction of carbonaceous reducing agent through the electrode and into the turbulent gaseous atmosphere in the electrode arc will depend upon many factors, such as the size of the electrode, the particular chemical or metallurgical process involved, the state of subdivision of the carbonaceous reducing agent, the geometry of the electric furnace, the power consumption of the electric arc, and numerous other factors well known to those familiar with electric furnace operation. In general, however, the amount of carbonaceous reducing agent introduced through the hollow electrode will be at least equal (in terms of chemical reduction equivalents) to the amount of electrode consumption which takes place in the absence of the carbonaceous agent added by the technique of this invention. In the case of elemental phosphorus production, for example, the amount of carbonaceous agent added in this way will generally be of the order of magnitude of 10% or so (e.g., between about 1 and about 20%), and preferably of the order of magnitude of 5% (e.g., between about 2 and about 10%) of the total carbonaceous reducing agent (including electrode consumption) utilized or consumed in the reduction process.

In carrying out the present invention care should be taken to prevent passage of the gaseous atmosphere or other constituents from the inside of the electric furnace through the opening in the electrode—since such a result would largely counteract the beneficial effects to be gained by the practice of the present invention. In order to insure that no gases or other constituents back up through the hollow electrodes, it will generally be desirable to keep the carbonaceous reducing agent reservoir under slightly higher pressure than the inside of the electric furnace. This can be done by introduction of a gas such as nitrogen, argon, hydrocarbons, carbon monoxide, or the like, into and through the reservoir and/or carbonaceous reducing agent feed system so that such gas is continuously passing slowly through the electrode and into the electric furnace along with carbonaceous reducing agent.

The following example is presented as a typical preferred specific embodiment of the practice of the present invention:

A three-electrode electric furnace for the production of elemental phosphorus is adapted for the practice of the present invention by removably mounting an airtight cylindrical metal tank upon the top of each of the 45 inch diameter carbon electrodes used in the phosphorus furnace. A 2 inch hole is bored along the axis of each electrode and a metering screw is mounted in the cylindrical reservoir and extending through the bottom of the reservoir and into the carbon electrode. The metering screw is driven by a motor mounted at the upper end of the cylindrical reservoir. The reservoir is filled through an opening in the upper end thereof, which opening is thereafter closed to make the reservoir airtight. Hydrocarbon gas is then continuously passed into the reservoir to maintain a pressure in the reservoir slightly greater than the pressure in the phosphorus furnace. The metering screw is continuously driven by the electric motor at a rate sufficient to introduce pulverized carbon (100% minus 8 mesh) through the center of each carbon electrode and into the arc at a rate of about 300 pounds per hour. During this time the rate of introduction of burden into the furnace is about 82,500 pounds per hour of phosphate rock, 24,000 pounds per hour of silica, and 11,200 pounds per hour of coke, which are introduced in the conventional form and manner. Operation of the phosphorus furnace in the above-described way results in reduction of carbon electrode consumption by at least about 50% of that which occurs under comparable conditions in the absence of the finely pulverized carbon introduced through the hollow electrode.

What is claimed is:

1. A method for reducing carbon electrode consumption in an electric furnace operation in which oxidic raw materials are processed, which method comprises continuously introducing into said electric furnace through the interior of said electrode a carbonaceous reducing agent in a sufficient amount and in a sufficiently fine state of dispersion to continuously maintain an appreciable concentration of such carbonaceous reducing agent in the turbulent gaseous atmosphere within the arc adjacent to said carbon electrode.

2. A method for reducing the consumption of electrodes consisting essentially of carbon in an electric furnace operation in which oxidic raw materials are processed, which method comprises continuously introducing into said electric furnace through the interior of said electrode a solid carbonaceous reducing agent in a sufficient amount and in a sufficiently fine state of subdivision to continuously maintain an appreciable concentration of such solid carbonaceous reducing agent dispersed in the turbulent gaseous atmosphere within the arc adjacent to said carbon electrode.

3. A method for reducing carbon electrode consumption in an electric furnace operation in which oxidic raw materials are processed, which method comprises continuously introducing into said electric furnace through the interior of said electrode solid carbon pulverized to a degree such that 90% thereof will pass a 4 mesh screen, the amount of said solid carbon being sufficient to continuously maintain an appreciable concentration of such solid carbon suspended in the turbulent gaseous atmosphere within the arc adjacent to said carbon electrode.

4. A method for reducing carbon electrode consumption during the electric furnace production of elemental phosphorus from phosphate rock, which method comprises continuously introducing into the electric furnace through the interior of said carbon electrode solid carbon pulverized to a degree such that 90% thereof will pass an 8 mesh screen, the amount of said solid pulverized carbon being between about 1 and about 20% of the total carbon utilized in the production of said elemental phosphorus.

5. A method for reducing carbon electrode consumption during the electric furnace production of elemental phosphorus from phosphate rock, which method comprises continuously introducing into the electric furnace through the interior of said carbon electrode solid carbon pulverized to a degree such that 100% thereof will pass an 8 mesh screen, the amount of said solid pulverized carbon being between about 2 and about 10% of the total carbon utilized in the production of said elemental phosphorus.

References Cited in the file of this patent

UNITED STATES PATENTS

| | | |
|---|---|---|
| 1,443,439 | Southgate | Jan. 30, 1923 |
| 1,946,252 | Wiles | Feb. 6, 1934 |
| 2,104,530 | Seil | Jan. 4, 1938 |
| 2,143,001 | Curtis et al. | Jan. 10, 1939 |
| 2,168,312 | Baily | Aug. 8, 1939 |
| 2,226,525 | Dolan | Dec. 24, 1940 |
| 2,303,973 | Armstrong | Dec. 1, 1942 |